United States Patent
Thienel

(10) Patent No.: US 12,172,350 B2
(45) Date of Patent: Dec. 24, 2024

(54) STRUCTURAL COMPONENT HAVING A PLURALITY OF ORGANIC SHEET PIECES, AND METHOD FOR THE PRODUCTION THEREOF

(71) Applicant: Brose Fahrzeugteile SE & Co. Kommanditgesellschaft, Bamberg, Bamberg (DE)

(72) Inventor: Michael Thienel, Thurnau (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 1042 days.

(21) Appl. No.: 16/971,067

(22) PCT Filed: Feb. 8, 2019

(86) PCT No.: PCT/EP2019/053079
§ 371 (c)(1),
(2) Date: Aug. 19, 2020

(87) PCT Pub. No.: WO2019/158436
PCT Pub. Date: Aug. 22, 2019

(65) Prior Publication Data
US 2020/0376727 A1  Dec. 3, 2020

(30) Foreign Application Priority Data
Feb. 19, 2018 (DE) ..................... 10 2018 202 475.8

(51) Int. Cl.
*B29C 45/00* (2006.01)
*B29C 45/14* (2006.01)
(Continued)

(52) U.S. Cl.
CPC .... *B29C 45/0062* (2013.01); *B29C 45/14311* (2013.01); *B29C 45/14508* (2013.01);
(Continued)

(58) Field of Classification Search
CPC ...................................................... B29C 45/00
(Continued)

(56) References Cited

U.S. PATENT DOCUMENTS

| | | | |
|---|---|---|---|
| 2011/0031643 A1 | 2/2011 | Hache et al. | |
| 2014/0030582 A1* | 1/2014 | Haspel | B32B 3/08 428/113 |
| 2016/0107348 A1* | 4/2016 | Preisser | B29C 45/14008 264/261 |

FOREIGN PATENT DOCUMENTS

| | | |
|---|---|---|
| DE | 10341134 A1 | 4/2005 |
| DE | 10341134 B4 | 2/2006 |

(Continued)

OTHER PUBLICATIONS

European Notice of Intent to Grant for EP 19704773.1 Dated Mar. 18, 2024, English Translation attached to original, All together 66 Pages.

*Primary Examiner* — Tahseen Khan
(74) *Attorney, Agent, or Firm* — Dickinson Wright PLLC

(57) ABSTRACT

A structural component, comprising at least two organo-sheet pieces which at least sectionally lie one on top of the other and which each include a fiber layer, wherein at least in the fiber layers of the organo-sheet pieces at least one pair of mutually aligned holes is formed, at which the organo-sheet pieces are positively connected to each other. There is furthermore proposed a method for manufacturing a structural component.

7 Claims, 7 Drawing Sheets

(51) Int. Cl.
*B29L 31/30* (2006.01)
*B60J 5/04* (2006.01)

(52) U.S. Cl.
CPC .................. *B29C 45/14786* (2013.01); *B29C 2045/0063* (2013.01); *B29C 2045/14327* (2013.01); *B29C 2045/14532* (2013.01); *B29C 2793/0045* (2013.01); *B29L 2031/3002* (2013.01); *B60J 5/0481* (2013.01)

(58) Field of Classification Search
USPC ........................................................ 428/133
See application file for complete search history.

(56) References Cited

FOREIGN PATENT DOCUMENTS

| | | |
|---|---|---|
| DE | 102012106936 A1 | 1/2014 |
| DE | 102014203344 A1 | 9/2014 |
| DE | 102013213711 A1 | 1/2015 |
| EP | 3009249 A1 | 4/2016 |
| WO | 2009095314 A1 | 8/2009 |
| WO | 2011095399 A1 | 8/2011 |

\* cited by examiner

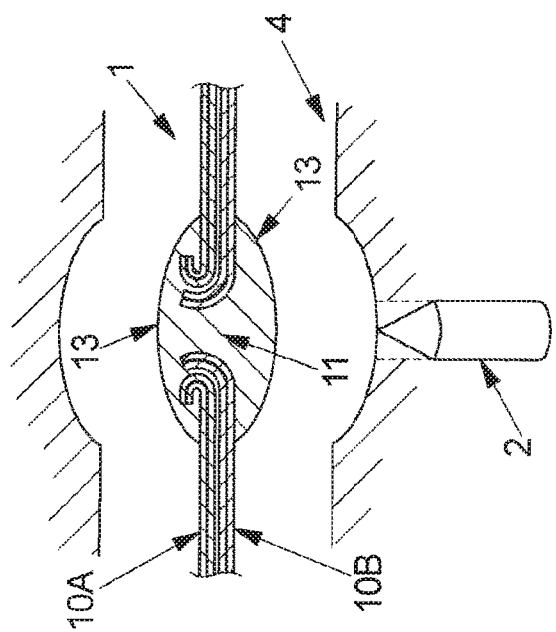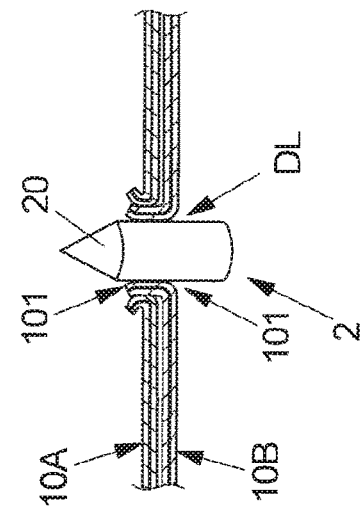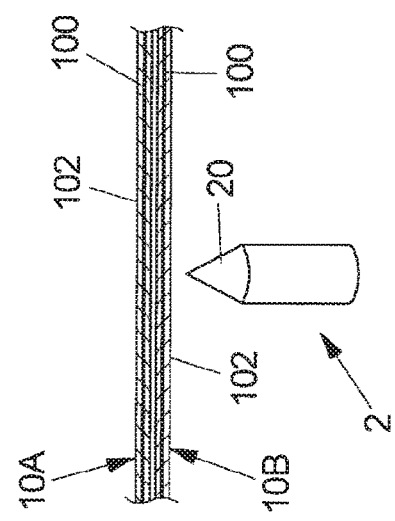

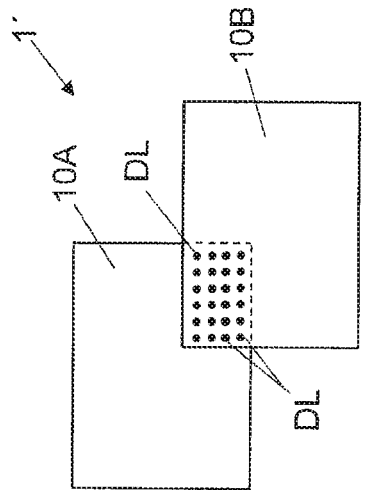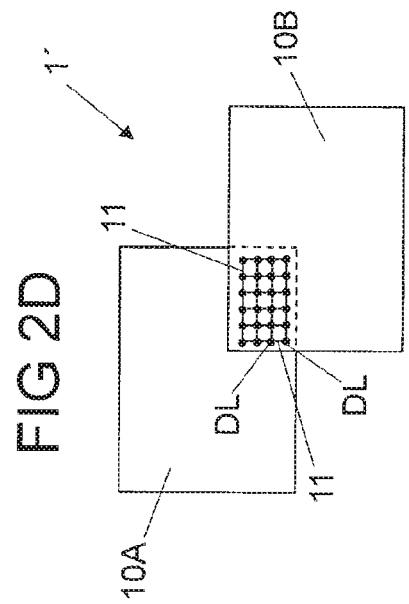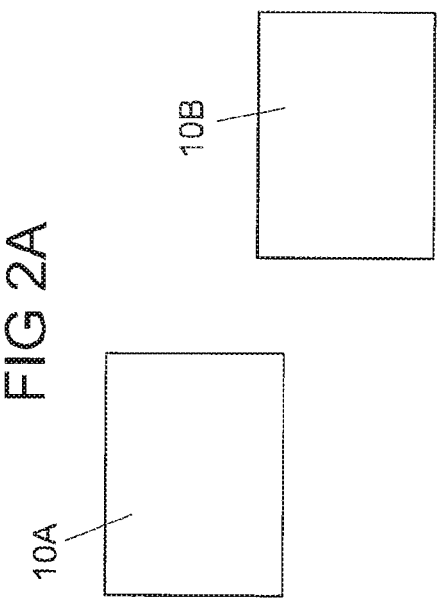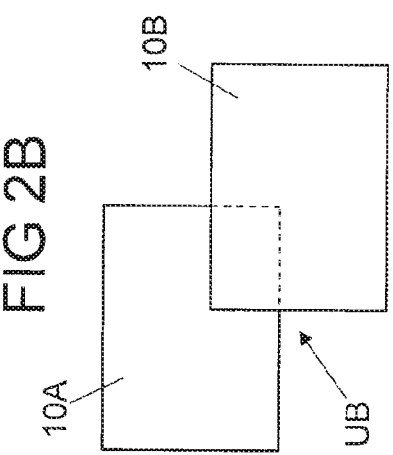

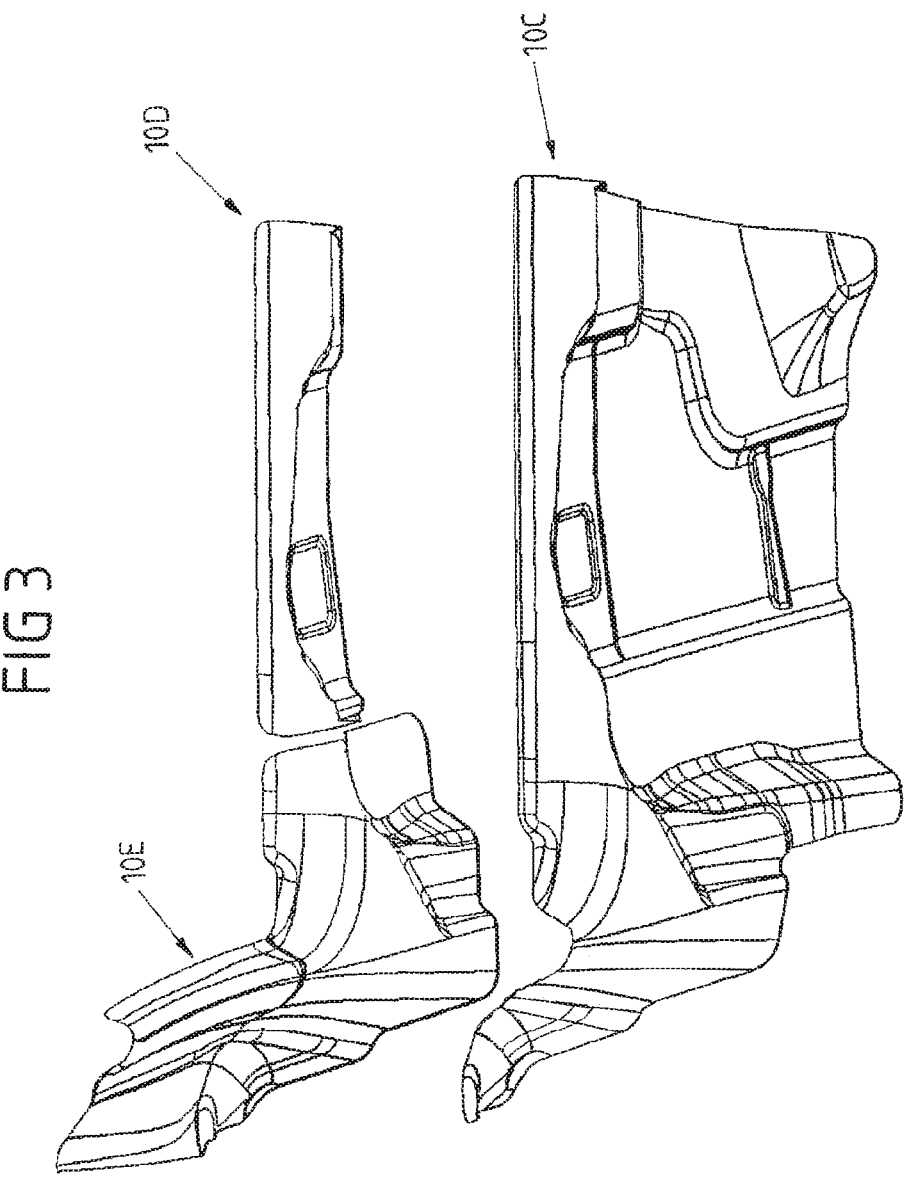

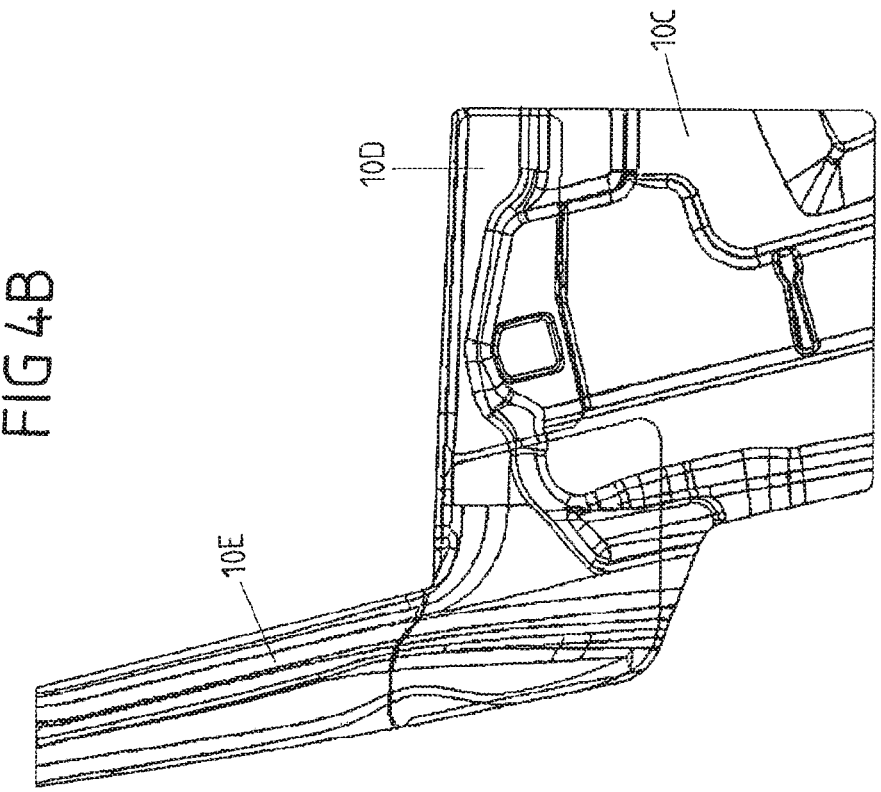

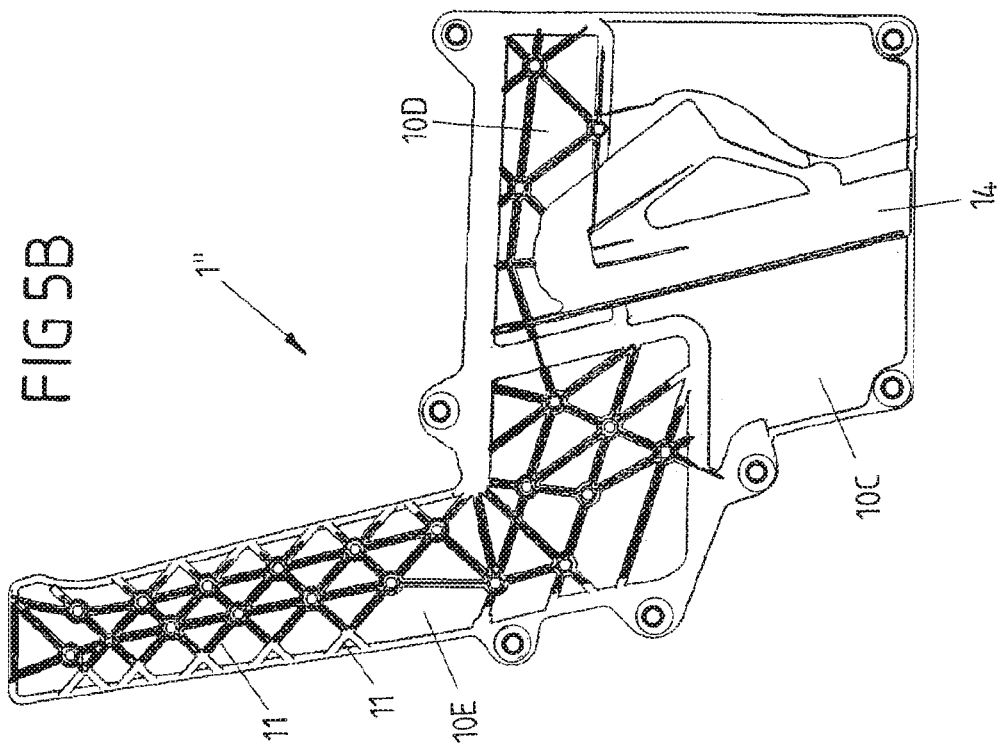
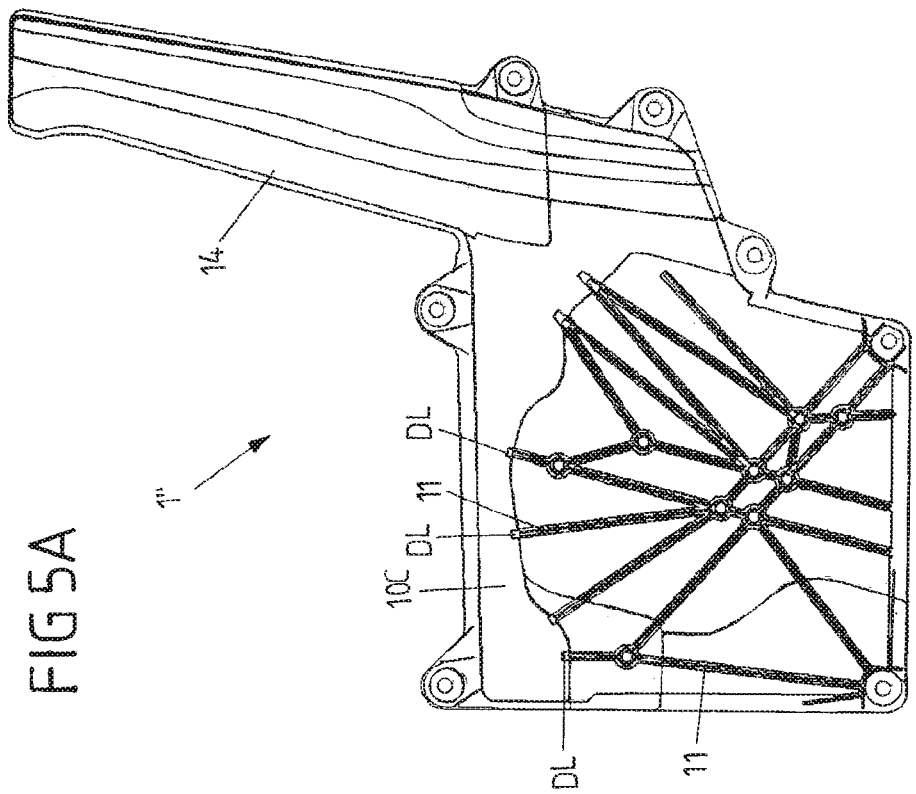

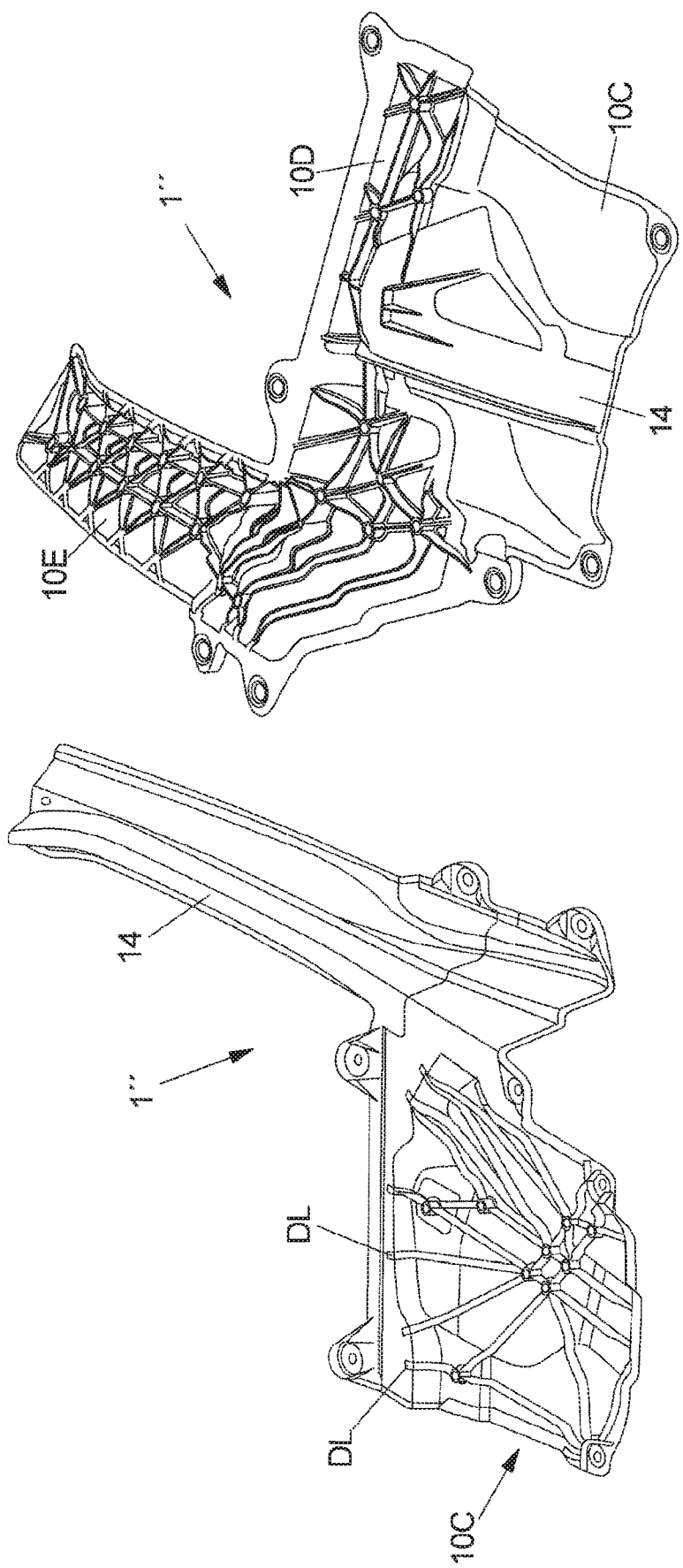

STRUCTURAL COMPONENT HAVING A PLURALITY OF ORGANIC SHEET PIECES, AND METHOD FOR THE PRODUCTION THEREOF

CROSS-REFERENCE TO RELATED APPLICATIONS

This application is the U.S. National Phase of PCT/EP2019/053079 filed Feb. 8, 2019, which claims priority to DE 10 2018 202 475.8 filed Feb. 19, 2018, the disclosures of which are hereby incorporated in their entirety by reference herein.

TECHNICAL FIELD

The present disclosure relates to a structural component formed by an organo sheet.

BACKGROUND

Structural components for example can have a supporting and/or structuring function, in particular in the automotive sector. The possible sites of use are manifold; for example, parts of seat frames, doors and the bodywork.

Organo-sheets are plate-like materials (semi-finished products) made of a fiber-reinforced, in particular continuous fiber-reinforced thermoplastic. The (continuous) fibers can be embedded in a thermoplastic matrix in the form of scrims, woven or knitted fabrics, e.g. made of glass, Kevlar, carbon or plastic fibers. Organo-sheets thus are thermoformable (hot-formable) composite materials. Suitable matrix materials include e.g. polyolefins, in particular polypropylene, as well as Plexiglass, polycarbonate, polystyrene and/or polyamide. When overmolding the organo-sheet with plastic material, the thermoplastic matrix can melt, whereby a firmly bonded connection with the overmolded plastic material can be obtained. Organo-sheets are therefore extremely versatile materials which allow the manufacture of structural components with low weight and high stability.

SUMMARY

One or more objects of the present disclosure is to provide a structural component that provides efficient use of organo-sheet.

According to one or more embodiments, a structural component, for use in a motor vehicle, for example, may include two or more organo-sheet pieces which at least sectionally lie one on top of the other, in particular flatly rest against each other. The organo-sheet pieces each include a fiber layer. At least in the fiber layers of the organo-sheet pieces, there is/are formed one pair or several pairs of holes each aligned with each other, to which (and by means of which) the organo-sheet pieces are fastened to each other, namely at least by a positive connection, in particular, by a form fit of the organo-sheet pieces with each other. The one hole of a pair of holes aligned with each other is formed on the one organo-sheet piece, while the other hole of the pair is formed on the other organo-sheet piece.

In this way, the two or more organo-sheet pieces (which can also be referred to as organo-patches) can be fastened to each other particularly securely and with a particularly small overlap. The positive fastening of the organo-sheet pieces to the holes aligned with each other (e.g. arranged in register with each other) provides for a particularly secure fastening of the organo-sheet pieces to each other. In this way, a particularly efficient material usage of organo-sheet can be achieved. The fastening of the organo-sheet pieces to each other is carried out in particular in the form of a non-releasable connection. For example, one portion of the one organo-sheet piece engages behind the other organo-sheet piece at the hole formed therein.

The individual organo-sheet pieces can each be formed e.g. as an organo-sheet cutting, for example be cut out or punched out of a larger organo-sheet plate. When manufacturing organo-sheet cuttings it is desirable to produce a small amount of waste material in order to achieve a use of organo-sheet as efficient as possible. The proposed structural component enables also to provide smaller organo-sheet pieces in the structural component, which so far would possibly have been lost as waste material.

The proposed structural component also allows to form more heavily stressed areas of the structural component e.g. with a more heavily loadable organo-sheet piece (e.g. thicker and/or provided with a thicker fiber layer), and in particular also when these areas are comparatively small. This also provides for a particularly efficient use of organo-sheet.

The organo-sheet pieces can be continuous fiber-reinforced organo-sheet pieces. The term "continuous fiber-reinforced" means that the length of the fibers used for reinforcement substantially is limited by the size of the plate-shaped (at least before a shaping process) organo-sheet pieces. It can be provided, for example, that within the edges of the continuous fiber-reinforced organo-sheet piece a fiber substantially is not interrupted.

The positive connection can be formed in particular between the fiber layers of the organo-sheet pieces. For example one organo-sheet extends with its fiber layer, e.g. with an edge of the hole, into the hole in the other organo-sheet piece so as to build up a positive connection. The fiber layers also can at least partly be pushed into each other or mixed with each other in the region of the aligned holes so that there is a form fit between individual fibers. A form fit between the fiber layers provides for a particularly secure connection of the organo-sheet pieces.

Alternatively or additionally, a filling can extend through the at least one pair of mutually aligned holes. The filling can be firmly bonded connected to the thermoplastic matrix of one or both organo-sheet pieces (and thus produce a firmly bonded connection between the organo-sheet pieces). The filling allows a particularly secure connection of the organo-sheet pieces. The filling can consist for example of an injection molding material, in particular of a fiber-reinforced (e.g. a long glass fiber-reinforced) injection molding material. Expressed in other words, the organo-sheet pieces can be sewn together by means of an injection molding material.

The filling may include, e.g. the same material or consists of the same material as the matrix of at least one of the organo-sheet pieces. In particular, it can include the same material as the matrix and can additionally be reinforced with fibers. This provides for a particularly secure firmly bonded (possibly additionally fiber-reinforced) connection of the organo-sheet pieces.

The filling in particular extends through the pair (or the pairs) of mutually aligned holes. On one side or on both sides of the overlapping organo-sheet pieces, the filling can be formed integrally (in particular by a uniform material) with one holding part each. The holding parts each have a larger diameter than the mutually aligned holes. In this way, a particularly secure positive connection of the organo-sheet pieces is possible.

In one embodiment, a plurality of pairs of mutually aligned holes is provided, which each are formed at least in the fiber layers of the organo-sheet pieces. For example, there are provided more than five, more than ten or more than 20 pairs of mutually aligned holes. This provides for a particularly secure fastening of the organo-sheet pieces to each other also on a small overlap area. In addition, the individual holes can then be formed with a small diameter.

Between at least two pairs of mutually aligned holes, which each are incorporated at least in the fiber layers of the mutually overlapping organo-sheet pieces, a reinforcing rib can be formed. In particular, the reinforcing rib extends along at least one of the organo-sheet pieces from the one pair to the other pair. The reinforcing rib in particular can be formed integrally with fillings of the at least two pairs of mutually aligned holes. On the one hand, the fillings can thereby be secured in their position. On the other hand, the holes provide a particularly secure fastening point (e.g. of uniform material) of the reinforcing rib.

Between at least two pairs of mutually aligned holes, at least one reinforcing rib each can be formed on both sides of the superimposed organo-sheet pieces. In this way, a particularly stable reinforcement of the structural component can be achieved. The reinforcing ribs can be integrally connected to each other (in particular by a uniform material) e.g. via the fillings of the pairs of mutually aligned holes.

The above-mentioned object also is achieved by a method of manufacturing a structural component, as described herein.

Accordingly, there is proposed a method for manufacturing a structural component, which may include the following steps:

providing two or more organo-sheet pieces, in particular in the form of organo-sheet cuttings (providing can comprise the cutting of an organo-sheet plate to form one or more of the organo-sheet pieces);

arranging the organo-sheet pieces in such a way that they sectionally or at least sectionally lie one on top of the other, in particular rest flat against each other; and incorporating, in particular piercing, at least one through hole extending through the two organo-sheet pieces into the (superimposed) organo-sheet pieces, and forming a positive connection of the organo-sheet pieces (in particular by a form fit of the organo-sheet pieces with each other) at the through hole.

The formation of the positive connection of the organo-sheet pieces can be a consequence of the incorporation of the through hole, e.g. by bringing material portions of both organo-sheet pieces into engagement with each other by piercing.

The in particular non-releasable fastening of the organo-sheet pieces to the through hole provides for a secure fastening of the organo-sheet pieces to each other so that the organo-sheet pieces can be arranged with a small overlap. This provides for an efficient material usage of organo-sheet.

The steps of arranging the organo-sheet pieces, of incorporating the through hole and of fastening the organo-sheet pieces to each other can be carried out in the same tool, in particular in an injection molding tool.

Before or after incorporating the through hole, the organo-sheet pieces can be reshaped. Optionally, the organo-sheet pieces are heated before being inserted into the injection molding tool or are heated in the injection molding tool and are reshaped on closing of the injection molding tool. Alternatively or in addition to reshaping, the organo-sheet pieces can also be pressed together, which provides for an additional flat adhesion to each other.

The at least one through hole extending through the two organo-sheet pieces can be incorporated in a heated state of the organo-sheet pieces. Due to the heating of the organo-sheet pieces, the matrix of each of the organo-sheet pieces is plastically deformable.

Optionally, the through hole is (jointly) incorporated into the (superimposed) organo-sheet pieces by means of a spike, e.g. in the form of a needle. The spike can be mounted on the injection molding tool. By sticking the spike into the previously heated organo-sheet pieces it is possible to incorporate a hole without severing the fibers. For example, the fibers of the fiber layers of the organo-sheet pieces can be pushed aside. The fiber layers here can become entangled and/or positively engage behind each other. Hence, the organo-sheet pieces can be needled together by means of the spike or the needle.

Optionally, an injection molding material is molded to the organo-sheet pieces (in the injection molding tool), wherein the at least one through hole extending through the organo-sheet pieces is filled up with a filling of injection molding material and/or reinforcing ribs or other functional elements are molded thereto. The reinforcing ribs and the filling can be molded to the organo-sheets as a continuous injection-molded portion.

Preferably, at least two, in particular more than two through holes each extending through the organo-sheet pieces are incorporated into the organo-sheet pieces, which provides for a particularly secure fastening.

At least one reinforcing rib can be molded to the organo-sheet pieces in such a way that it connects the at least two through holes (and in particular the fillings incorporated therein) to each other.

The method in particular can be designed for manufacturing a structural component according to any of the embodiments described herein. With regard to the respective advantages of the individual embodiments reference is made to the corresponding foregoing and following description.

BRIEF DESCRIPTION OF THE DRAWINGS

The idea underlying the invention will be explained in detail below with reference to the exemplary embodiments illustrated in the Figures. There are shown in:

FIGS. 1A to 1C show schematic cross-sectional views of two organo-sheet pieces that are jointly pierced with a spike and are connected to each other;

FIGS. 2A to 2D show schematic top views of two organo-sheet pieces in various stages of the manufacture of a structural component;

FIG. 3 shows a perspective view of three organo-sheet pieces for manufacturing a structural component for a vehicle door;

FIGS. 4A and 4B show top views of two sides of a partly superimposed arrangement of the three organo-sheet pieces of FIG. 3;

FIGS. 5A and 5B top show views of two sides of a structural component manufactured with the arrangement of FIGS. 4A and 4B;

FIGS. 5C and 5D show perspective views of two sides of the structural component of FIGS. 5A and 5B.

DETAILED DESCRIPTION

Figure 6B:
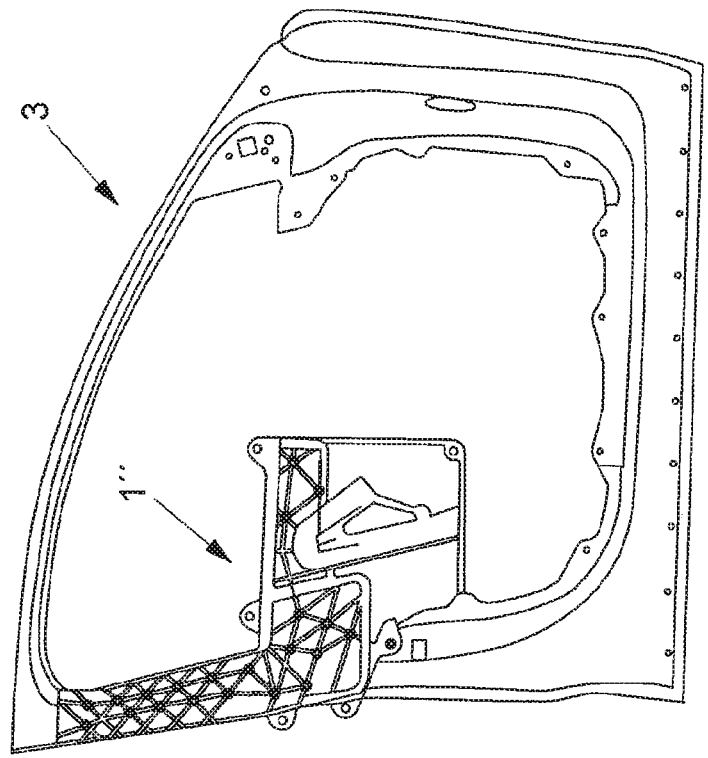
FIGS. 6A and 6B show top views of two sides of a vehicle door inner panel with the structural component of FIGS. 6A and 6B.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

From DE 10 2013 213 711 A1 it is known to manufacture a structural component from an organo-sheet. Here, an organo-sheet piece is subjected to a hot forming process for manufacturing the structural component.

To the applicant it is internally known from practice to manufacture structural components from several organo-sheet pieces. To ensure that the individual organo-sheet pieces are securely fastened to each other in the finished structural component, the organo-sheet pieces are usually placed one beside the other with a relatively large overlap and hot pressed. In order to ensure that the organo-sheet pieces securely adhere to each other, it is necessary to provide comparatively large overlap areas. However, such large overlap areas are often not necessary for the stability of the structural component. However, since the manufacture of organo-sheet is very expensive, its efficient use on the structural component is desirable. It has also been found that the hot pressing of the organo-sheets must take place within a relatively small optimum temperature window. Thus, the exact monitoring of the temperature can make the manufacturing method comparatively expensive.

FIG. 1A shows two organo-sheet pieces 10A and 10B, which in the area shown in FIG. 1A lie one on top of the other, here in flat abutment. The organo-sheet pieces 10A, 10B each include a fiber layer 100 in the form of a fiber mat, e.g. as a scrim or knitted fabric. The fiber layer 100 each is embedded in a matrix 102 of a thermoplastic material. The organo-sheet pieces 10A, 10B in particular are each made of a thermoplastic woven or laid glass fiber fabric.

FIG. 1A furthermore shows a spike 2 with a tip 20 adjacent to the organo-sheet pieces 10A, 10B. For example, the organo-sheet pieces 10A, 10B are clamped into a tool, e.g. an injection molding tool. The spike 2 can be mounted, e.g. shiftably mounted, on the injection molding tool. The spike 2 for example has a diameter of 3 to 4 mm.

FIG. 1B shows the organo-sheet pieces 10A, 10B of FIG. 1A after the spike 2 has been shifted perpendicularly to the surface of the organo-sheet pieces 10A, 10B and thus has pierced holes 101 (with the diameter of the spike 2) into the organo-sheet pieces 10A, 10B. By means of the spike, the organo-sheet pieces 10A, 10B thus are (in particular jointly) pierced or punched.

The holes 101 of the two organo-sheet pieces 10A, 10B are aligned coaxially relative to each other. The holes 101 are in register with each other, hence are arranged in alignment with each other. The holes jointly form a through hole DL through both organo-sheet pieces 10A, 10B.

The piercing of the organo-sheet pieces 10A, 10B in particular can be performed after heating the organo-sheet pieces 10A, 10B. In the region of the holes 101, fibers of the fiber layers 100 of the organo-sheet pieces 10A, 10B have been pushed aside by the tip 20 of the spike 2. Due to the (joint) piercing of the holes 101, the organo-sheet pieces 10A, 10B enclose each other in the region of the holes 101. Between the (needled) organo-sheet pieces 10A, 10B a form fit exists, by which the organo-sheet pieces 10A, 10B are fastened to each other.

The organo-sheet pieces 10A, 10B fastened to each other form a structural component 1. The structural component 1 for example is a trim part or a body part of a motor vehicle.

After piercing the organo-sheet pieces 10A, 10B by way of the spike 2, the spike 2 is again withdrawn from the through hole DL. Thereupon, a filling is introduced into the through hole DL, e.g. injected by way of injection molding.

The through hole DL serves as a flow channel for injection molding material.

FIG. 1C shows the organo-sheet pieces 10A, 10B after introducing the filling 11 into the through hole DL, i.e. into both holes 101 of the organo-sheet pieces 10A, 10B. The filling 11 secures the organo-sheet pieces 10A, 10B in the form-fitting position in the region of the holes 101.

Furthermore, it is not only the interior of the through hole DL that is filled up with the filling 11. In addition, the material of the filling 11 is expanded beyond the edges of the holes 101 on both sides of the organo-sheet pieces 10A, 10B resting against each other. On both sides of the organo-sheet pieces 10A, 10B a holding part 13 is formed thereby, which provides a particularly secure positive connection of the organo-sheet pieces 10A, 10B at the through hole DL.

FIG. 1C furthermore schematically shows an (open) injection molding tool 4 for overmolding the injection molding material and optionally for shaping the organo-sheet pieces 10A, 10B, on which the spike 2 is shiftably mounted.

With reference to FIGS. 2A to 2D, the method for manufacturing a repeatedly needled structural component 1' will now be explained in detail.

In a first step, the two organo-sheet pieces 10A, 10B (also referred to as organo-patches) are provided, see FIG. 2A, which can include (e.g. cutting or punching) out of a larger organo-sheet plate. Both organo-sheet pieces 10A, 10B each are flat and even, and it is also possible to connect uneven organo-sheet pieces in the way described here. In one embodiment, the steps of punching, shaping and injection molding are carried out in the same tool.

In a further step, the organo-sheet pieces 10A, 10B are arranged such that they sectionally lie one on top of the other, see FIG. 2B. In the present case, the organo-sheet pieces 10A, 10B lie one on top of the other in an overlap area UB, concretely in flat abutment. Arranging the organo-sheet pieces 10A, 10B sectionally one on top of the other can be effected in particular by placing the organo-sheet pieces 10A, 10B in the tool, e.g. in the injection molding tool.

In a further step, a plurality of through holes DL is incorporated through both organo-sheet pieces 10A, 10B, see FIG. 2C. Incorporating each of the through holes DL can be effected as explained in detail in connection with FIGS. 1A and 1B for an individual through hole DL.

On the one hand, it is possible to incorporate several or all of the through holes DL (one after the other) by way of the same spike 2. On the other hand, a separate spike 2 can also be provided for each through hole DL to be made, so that all through holes DL can be made at the same time.

In the example of FIG. 2C a raster, more exactly a matrix, of several rows and columns of through holes DL is incorporated into the organo-sheet pieces 10A, 10B.

By punching or needling the organo-sheet pieces 10A, 10B, the same already are fastened to each other and jointly form the structural component 1'.

In a next step, ribbings, namely stiffening ribs 11, are injected through the needled through holes DL, concretely by injection molding by means of the injection molding tool, see FIG. 2D.

An injection molding material for example a long glass fiber-reinforced material, in particular a long glass fiber-reinforced injection molding material can be used.

The stiffening ribs 11 as shown in FIG. 2D serve as holding parts (like the holding parts 13 of FIG. 1C). In addition, the stiffening ribs 11 stiffen the structural component 1', e.g. against torsions.

In the example of FIG. 2D, each through hole DL is connected to at least two adjacent through holes DL by way of the stiffening ribs 11. In the present case, a group of mutually parallel stiffening ribs 11 extend across several through holes DL. Another group of mutually parallel stiffening ribs 11 extends perpendicularly to the first-mentioned group of stiffening ribs 11.

By injecting through the through holes DL, a particularly good stability is provided to the injection-molded stiffening ribs 11.

Optionally, stiffening ribs 11 can be formed (injection-molded) on both sides of the organo-sheet pieces 10A, 10B connected to each other, which can further increase the stability of the structural component 1'.

The injection molding of the organo-sheet pieces 10A, 10B through the needled through holes DL can also be referred to as "injection sewing". It has a similar effect as sewing, e.g. by means of a thread. The injection molding material injected through the through holes DL uniformly extends through the through holes DL and, due to the stiffening ribs 11, across several through holes DL. There is achieved a particularly secure connection of the two organo-sheet pieces 10A, 10B.

Because the organo-sheet pieces 10A, 10B are fastened to each other securely, the overlap area UB can be comparatively small. This reduces the amount of organo-sheet needed to form the secure connection. In addition, this provides for an improved, needs-oriented adaptation of the stability of the structural component 1' with the lowest possible weight.

Optionally, the organo-sheet pieces 10A, 10B (e.g. at the same time as injection sewing) are hot-pressed (in particular in a molten state) in order to achieve an even further improved fastening of the organo-sheet pieces 10A, 10B to each other.

FIGS. 1A to 2D each have shown the connection of two organo-sheet pieces 10A, 10B. Of course, however, it is also possible to connect more than two organo-sheet pieces 10A, 10B to each other in the described way. It is also possible to make through holes through more than two layers of superimposed organo-sheet pieces, e.g. through three or more superimposed organo-sheet pieces.

FIG. 3 shows another exemplary embodiment of a plurality of organo-sheet pieces, here three organo-sheet pieces 10C-10E.

The organo-sheet pieces 10C-10E of FIG. 3 are pre-shaped already, i.e. each manufactured from an even organo-sheet piece by reshaping (in particular thermoforming).

The organo-sheet pieces 10C-10E are configured to jointly form a structural component 1" in the form of a part of a door inner panel of a motor vehicle. The organo-sheet pieces 10C-10E have properties different from each other. The individual organo-sheet pieces 10C-10E here are adapted to the requirements of the structural component 1" of that area which is formed by the respective organo-sheet piece 10C-10E.

In the finished structural component 1", a first organo-sheet piece 10C forms a flat portion, e.g. a part of an assembly carrier, and is made of a (thin) organo-sheet, here with a thickness of 0.6 mm for example. A second organo-sheet piece 10D in the finished structural component 1" forms part of a horizontal carrier of the door inner panel. The second organo-sheet piece 10D is manufactured from an organo-sheet of medium thickness, here with a thickness of 1.0 mm for example. A third organo-sheet piece 10E in the finished structural component 1" forms part of a holm of the door inner panel. The holm must withstand particularly strong loads. Therefore, the first organo-sheet piece 10C is manufactured from a thick organo-sheet, in the present example with a thickness of 1.5 mm for example.

FIGS. 4A and 4B show the organo-sheet pieces 10C-10E in a state in which they are arranged one on top of the other. The first organo-sheet piece 10C and the (smaller) second organo-sheet piece 10D overlap the entire surface of the second organo-sheet piece 10D. The second organo-sheet piece 10D thus reinforces the first organo-sheet piece 10C. The first organo-sheet piece 10C and the (smaller) third organo-sheet piece 10E partly overlap. The second and the third organo-sheet piece 10D, 10E do not overlap.

FIGS. 5A to 5D show the finished structural component 1". The three organo-sheet pieces 10C-10E are fastened to each other by injection sewing. A plurality of through holes DL connects the first to the second organo-sheet piece 10C, 10D and the first to the third organo-sheet piece 10C, 10E.

A network of stiffening ribs 11 is formed on both sides of the structural component 1".

The edges of the organo-sheet pieces 10C-10E are overmolded with injection molding material. The fiber layers of the organo-sheet pieces 10C-10E can be protected thereby. Optional lugs or other connecting elements are injection-molded to the structural component 1". All injection-molded portions can be formed without undercuts, which provides for an easy manufacture.

Furthermore, there are formed flatly overmolded areas 14, namely in the present example on a portion of the structural component 1" visible to the outside, here on the holm. Another flatly overmolded area is provided in the form (of at least a part) of a guide rail for a window lifter. In particular surfaces visible to the outside can be provided with a surface structure, e.g. with a grain, by a corresponding injection molding method.

Figure 6A:
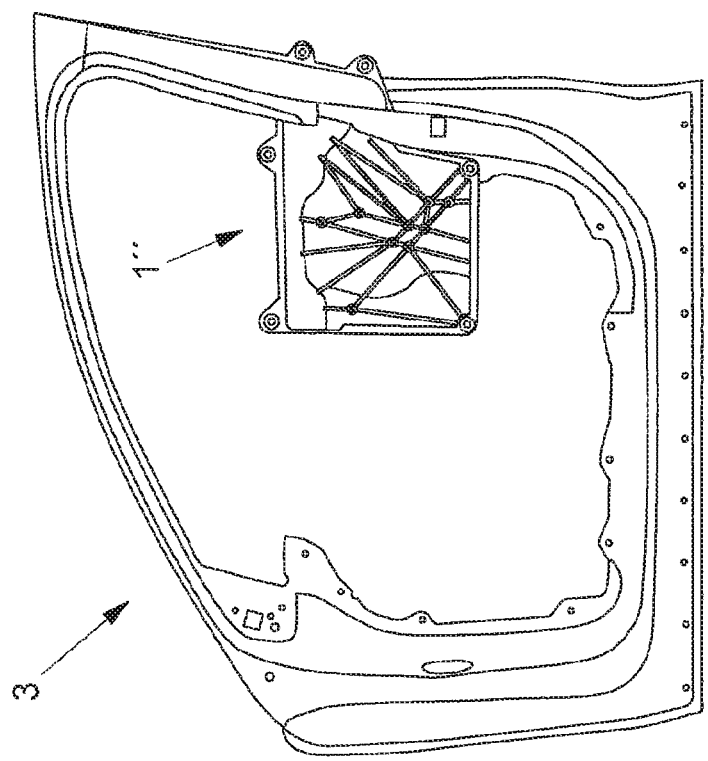

FIGS. 6A and 6B show a door inner panel 3 for a vehicle door, wherein the structural component 1" of FIGS. 5A-5D forms a part of the door inner panel 3. The structural component provides a structuring function (and in the illustrated example also a supporting function).

In the example shown in FIGS. 6A and 6B, the structural component 1" is connected, e.g. screwed, to a metal sheet which forms the remaining door inner panel 3. Alternatively, the remaining parts of the door inner panel 3 also are manufactured in the form of a structural assembly as described herein.

The illustrated configuration of the structural assembly 1" as shown in FIGS. 5A-5D only is an example. For example, the structural assembly might form the entire door inner panel. For this purpose, a plurality of organo-sheet pieces can be connected to each other by injection sewing.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1, 1', 1" structural component
10A-10E organo-sheet piece 100 fiber layer
101 hole
102 matrix
11 filling
12 reinforcing rib
13 holding part
14 flatly overmolded area
2 spike
3 door inner panel
4 injection molding tool
20 tip
DL through hole
UB overlap area While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A structural component comprising:
at least two organo-sheet pieces at least partially lying one on top of another and each including a fiber layer, wherein at least two of the fiber layers define a pair of holes, wherein each of the holes are aligned with one another, wherein the at least two organo-sheet pieces are positively connected to each other in a region defining the pair of holes,
wherein the fiber layer of a first one of the organo-sheet pieces extends with an edge of its hole into the hole in the fiber layer of the other, second organo-sheet piece, thereby forming the positive connection between the at least two fiber layers, wherein the second organo-sheet piece has a first side and a second side opposing the first side and the first organo-sheet piece is arranged on the first side and the edge of its hole is arranged on the second side.

2. The structural component of claim 1, wherein a filling extends through at least one pair of holes.

3. The structural component of claim 2, wherein at least one of the at least two organo-sheet pieces includes a matrix formed by a first material, and the filling is formed by the first material.

4. The structural component of claim 3, further comprising:
a holding part having a first diameter, wherein the filling extends through the pair of holes and is disposed on both sides of overlapping portions of the at least two organo-sheet pieces and is integrally connected to the holding part, wherein each of the holes of the pair of holes defines a second diameter, and wherein the second diameter is less than the first diameter.

5. The structural component of claim 1, wherein each of the at least two fiber layers defines a plurality of holes, wherein the plurality of holes includes the pair of holes, and wherein each of the holes defined by a first fiber layer of the at least two fiber layers are aligned with each of the holes defined by a second fiber layer of the at least two fiber layers.

6. The structural component of claim 1, wherein each of the at least two fiber layers define a plurality of holes, wherein the plurality of holes includes the pair of holes, and wherein each of the holes defined by a first fiber layer of the at least two fiber layers are aligned with each of the holes defined by a second fiber layer of the at least two fiber layers, wherein a reinforcing rib is formed between the pair of holes and another pair holes of the plurality of holes, and wherein the other pair of holes are aligned with one another.

7. The structural component of claim 1, wherein each of the at least two fiber layers define a plurality of holes, wherein the plurality of holes includes the pair of holes, and wherein each of the holes defined by a first fiber layer of the at least two fiber layers are aligned with each of the holes defined by a second fiber layer of the at least two fiber layers, wherein a reinforcing rib is formed on each side of the at least two organo-sheet pieces and is between the pair of holes and another pair holes of the plurality of holes, and wherein the other pair of holes are aligned with one another.

* * * * *